(12) United States Patent
Yee

(10) Patent No.: US 8,508,919 B2
(45) Date of Patent: Aug. 13, 2013

(54) SEPARATION OF ELECTRICAL AND OPTICAL COMPONENTS

(75) Inventor: Dawson Yee, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 476 days.

(21) Appl. No.: 12/559,170

(22) Filed: Sep. 14, 2009

(65) Prior Publication Data
US 2011/0064402 A1 Mar. 17, 2011

(51) Int. Cl.
G06F 1/16 (2006.01)
(52) U.S. Cl.
USPC ........................ 361/679.01; 356/603; 345/426
(58) Field of Classification Search
USPC .............. 361/679.01; 356/375, 603; 345/426
See application file for complete search history.

(56) References Cited

U.S. PATENT DOCUMENTS

| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |

(Continued)

FOREIGN PATENT DOCUMENTS

| CN | 201254344 B | 6/2010 |
| EP | 0583061 A2 | 2/1994 |

(Continued)

OTHER PUBLICATIONS

Levy, et al., "A Concept for Zero-Alignment Micro Optical Systems", retrieved at <<http://www.osti.gov/bridge/servlets/purl/14031-w1KnhU/webviewable/14031.pdf>>, Proc. SPIE vol. 3879, Micromachine Technology for Diffractive and Holographic Optics, pp. 167-173.

(Continued)

Primary Examiner — Adrian S Wilson
(74) Attorney, Agent, or Firm — Alleman Hall McCoy Russell & Tuttle LLP

(57) ABSTRACT

Embodiments related to establishing and maintaining precision alignment in an optical system are disclosed. For example, one disclosed embodiment provides an optical device comprising an outer casing and a rigid optical support disposed within an interior of the outer casing and to which a plurality of optical components are mounted. The embodiment further comprises a printed circuit board spatially separated from the optical support and the plurality of optical components, wherein one or more electrical components are mounted to the printed circuit board. The embodiment also comprises one or more electrical conductors electrically connecting the one or more electrical components to the one or more optical components.

19 Claims, 2 Drawing Sheets

(56) References Cited

U.S. PATENT DOCUMENTS

| | | |
|---|---|---|
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,549,288 B1* | 4/2003 | Migdal et al. ............ 356/603 |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B1 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,886,948 B2* | 5/2005 | Nakano ............ 353/119 |
| 6,894,902 B2* | 5/2005 | Chang ............ 361/715 |
| 6,930,725 B1* | 8/2005 | Hayashi ............ 348/373 |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,146,083 B2 | 12/2006 | Carr |
| 7,156,526 B2* | 1/2007 | Tanaka ............ 353/119 |
| 7,170,492 B2 | 1/2007 | Bell |
| 7,184,048 B2 | 2/2007 | Hunter |
| 7,202,898 B1 | 4/2007 | Braun et al. |
| 7,214,128 B2* | 5/2007 | Kriesel ............ 452/157 |
| 7,222,078 B2 | 5/2007 | Abelow |
| 7,227,526 B2 | 6/2007 | Hildreth et al. |
| 7,259,747 B2 | 8/2007 | Bell |
| 7,287,866 B2* | 10/2007 | Yamamoto et al. ......... 353/119 |
| 7,308,112 B2 | 12/2007 | Fujimura et al. |
| 7,317,836 B2 | 1/2008 | Fujimura et al. |
| 7,348,963 B2 | 3/2008 | Bell |
| 7,349,604 B2 | 3/2008 | Clark |
| 7,359,121 B2 | 4/2008 | French et al. |
| 7,367,887 B2 | 5/2008 | Watabe et al. |
| 7,369,334 B2 | 5/2008 | Case et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,391,409 B2* | 6/2008 | Zalewski et al. ............ 345/156 |
| 7,408,643 B2 | 8/2008 | Kimba et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,505,111 B2 | 3/2009 | Hirukawa et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,627,139 B2* | 12/2009 | Marks et al. ............ 382/103 |
| 7,646,372 B2* | 1/2010 | Marks et al. ............ 345/156 |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |

| | | | |
|---|---|---|---|
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,782,297 | B2 * | 8/2010 | Zalewski et al. ............. 345/156 |
| 7,809,167 | B2 | 10/2010 | Bell |
| 7,834,846 | B1 | 11/2010 | Bell |
| 7,852,262 | B2 | 12/2010 | Namineni et al. |
| 7,874,917 | B2 * | 1/2011 | Marks et al. .................... 463/36 |
| RE42,256 | E | 3/2011 | Edwards |
| 7,898,522 | B2 | 3/2011 | Hildreth et al. |
| 7,980,700 | B2 * | 7/2011 | Hayashi .......................... 353/15 |
| 7,986,321 | B2 * | 7/2011 | Zhuang et al. ................ 345/426 |
| 7,995,834 | B1 * | 8/2011 | Knighton et al. ............. 382/154 |
| 7,997,736 | B2 * | 8/2011 | Yoshimura et al. ............. 353/52 |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2002/0037668 | A1 * | 3/2002 | Tseng et al. .................. 439/660 |
| 2006/0158522 | A1 * | 7/2006 | Pryor ....................... 348/207.99 |
| 2006/0264258 | A1 * | 11/2006 | Zalewski et al. ................ 463/36 |
| 2006/0291719 | A1 * | 12/2006 | Ikeda et al. ................... 382/154 |
| 2007/0021208 | A1 * | 1/2007 | Mao et al. ........................ 463/36 |
| 2007/0023716 | A1 * | 2/2007 | van der Burgt et al. . 250/559.29 |
| 2007/0195435 | A1 | 8/2007 | Theriault et al. |
| 2008/0024999 | A1 * | 1/2008 | Huang .......................... 361/724 |
| 2008/0026838 | A1 | 1/2008 | Dunstan et al. |
| 2008/0056561 | A1 * | 3/2008 | Sawachi ........................ 382/154 |
| 2008/0156619 | A1 * | 7/2008 | Patel et al. ................. 198/502.2 |
| 2009/0016642 | A1 * | 1/2009 | Hart .............................. 382/278 |
| 2009/0169095 | A1 * | 7/2009 | Zhuang et al. ................ 382/154 |
| 2009/0279056 | A1 * | 11/2009 | Belliveau et al. ............. 353/119 |

FOREIGN PATENT DOCUMENTS

| | | |
|---|---|---|
| EP | 0801757 B1 | 10/2004 |
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

"Mounting & Positioning Equipment", retrieved at <<http://www.dataoptics.com/mountposit.htm>>, Jul. 21, 2009, pp. 2.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, Vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

* cited by examiner

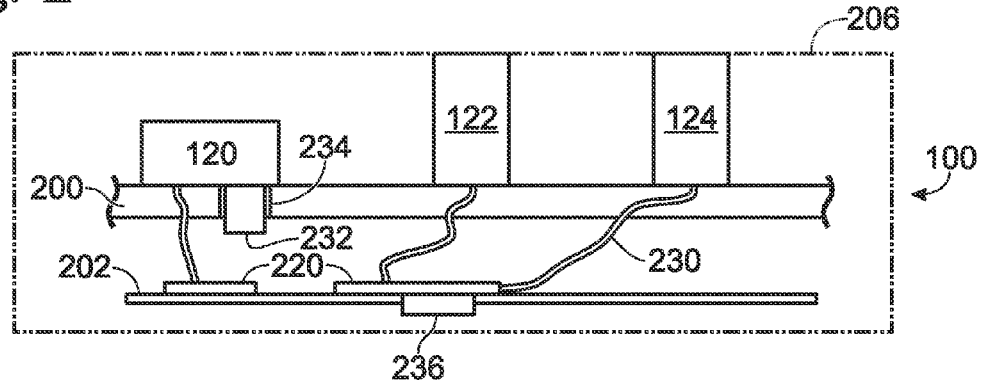
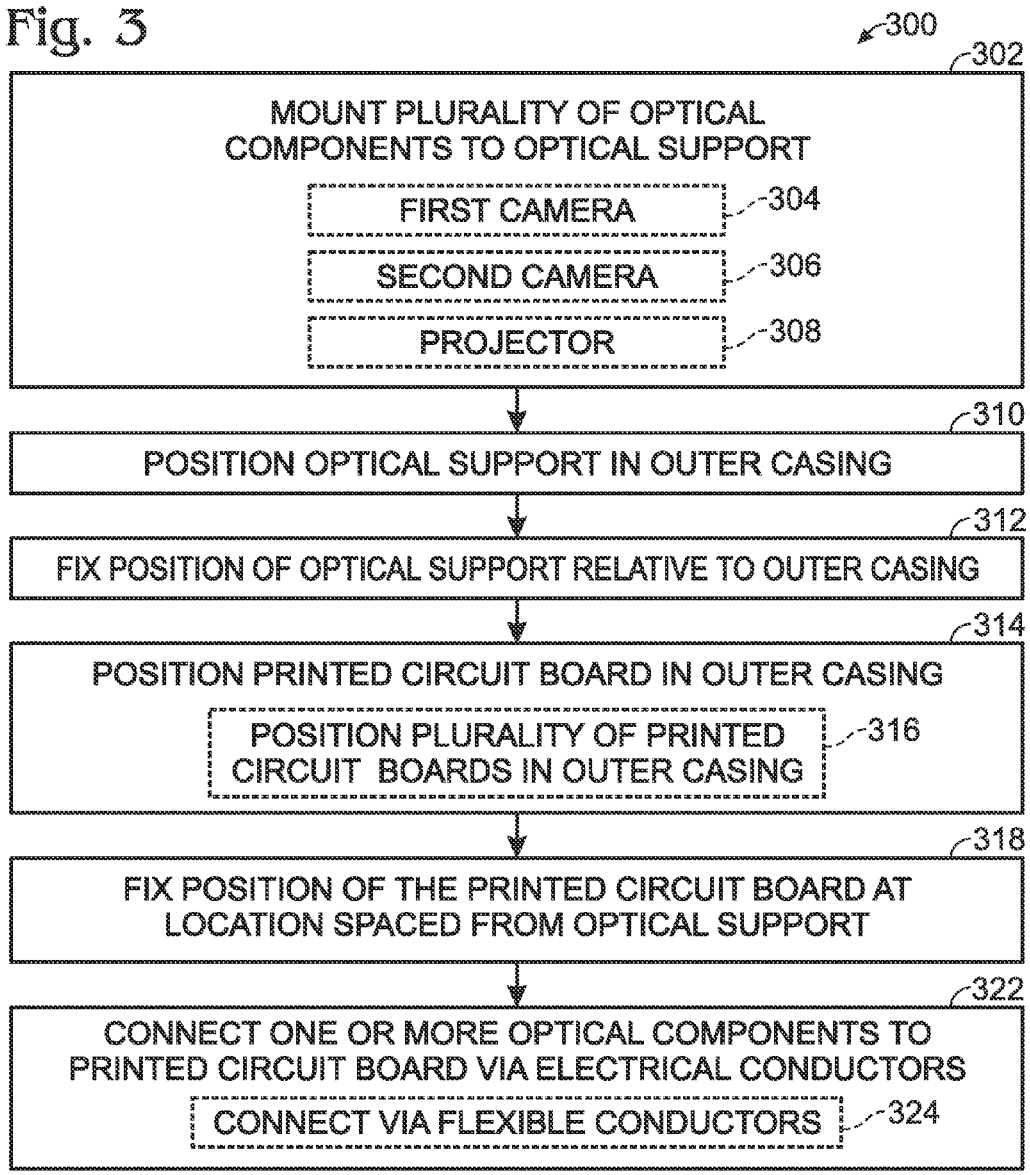

SEPARATION OF ELECTRICAL AND OPTICAL COMPONENTS

BACKGROUND

Various optical systems utilize multiple optical elements that are spaced from one another and that cooperate to produce a desired optical signal. For example, a structured light depth-sensing system utilizes a projector configured to produce a structured light pattern, and a camera configured to acquire an image of the structured light pattern as projected onto a target. A computing device may compare the acquired image to a reference image to determine a distance of the target from the camera based upon differences between the structured light pattern in the acquired image and the reference image.

Maintenance of precision alignment between optical components may help to ensure that such precision optical systems operate in a consistently reliable manner. However, current manufacturing methods used to make many optical systems may make it difficult to establish and maintain such precision alignment in a cost-effective manner.

SUMMARY

Accordingly, various embodiments are disclosed herein related to establishing and maintaining precision alignment in an optical system. For example, one disclosed embodiment provides an optical device comprising an outer casing and an optical support disposed within an interior of the outer casing and to which a plurality of optical components are mounted. The embodiment further comprises a printed circuit board spatially separated from the optical support and the plurality of optical components, wherein one or more electrical components are mounted to the printed circuit board. Further, one or more electrical conductors electrically connect the one or more electrical components to the one or more optical components.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows a schematic depiction of embodiments of an optical support connected to a printed circuit board via a plurality of flexible electrical connectors.

FIG. 3 shows a flow diagram depicting an embodiment of a method for assembling an optical device.

DETAILED DESCRIPTION

Figure 1:
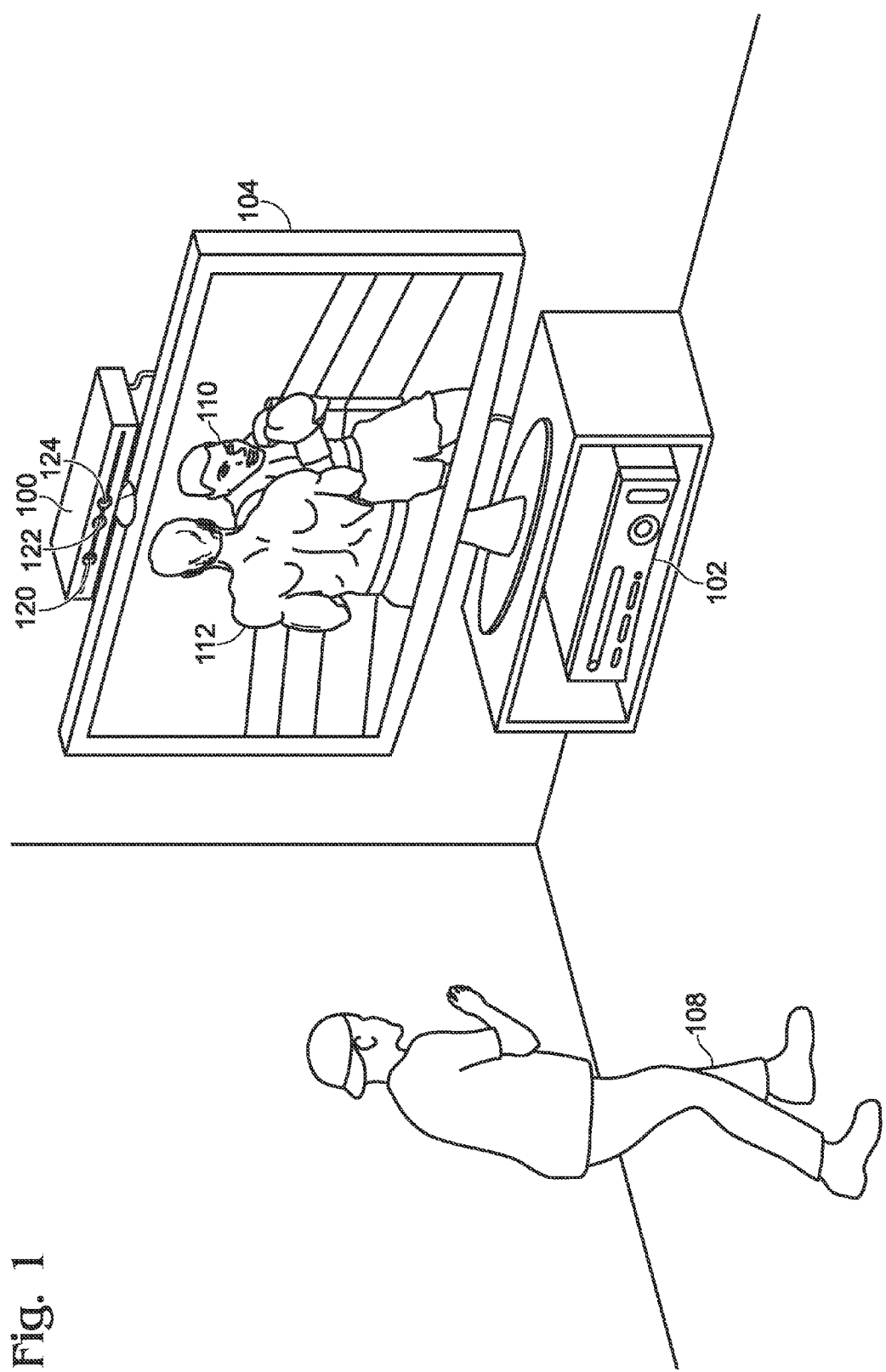
FIG. 1 shows an example embodiment of an optical device in the form of a depth sensing camera system.

As described above, the establishment and maintenance of precision alignment between optical components in an optical device may be difficult to achieve in a cost-effective manner. For example, in many optical devices, optical components are mounted directly to a printed circuit board on which the electronic components of the device, such as controllers, etc., are also mounted. Such printed circuit boards may be constructed with relatively loose tolerances, such that locations of electrical components and mounting structures for optical components may vary more than desired. Relatively time-consuming and expensive optical alignment processes may be used to compensate for this. Further, printed circuit boards may not be mechanically robust, and therefore may be prone to undesirable degrees of thermal expansion, warping, and other mechanical deformations. Additionally, the presence of the electrical components on the circuit board may contribute to dimensional variation caused by thermal expansion, as varying amounts of heat output by the electrical components and associated heat sinks may cause the dimensions of the printed circuit board, and therefore the relative positions of optical components mounted to the printed circuit board, to vary with time. These factors may contribute to higher cost, lower optical yield, and lower operating performance.

Accordingly, embodiments are disclosed herein that relate to the separation of optical components and electrical components in an optical device. An example embodiment of an optical device is shown in FIG. 1 as a structured light depth-sensing camera 100. The depth-sensing camera 100 is shown in the context of a computer gaming system 102 that may be used to play a variety of different games, play one or more different media types, and/or control or manipulate non-game applications. FIG. 1 also shows a display in the form of a television 104 that may be used to present game visuals to game players, such as game player 108.

The depth-sensing camera 100 may be used in combination with software on the gaming system 102 to track one or more targets, such as game player 108, in the field of view of the depth-sensing camera 100, by comparing images of the targets taken at different times to detect motion. Gaming system 102 may then display a response to the motion on the television 104. FIG. 1 shows a scenario in which the game player 108 is tracked using the depth-sensing camera 100 so that the movements of the game player 18 may be interpreted by the gaming system 102 as controls that can be used to affect the game being executed by the gaming system 102. In other words, the game player 108 may use his movements to control the game.

The example scenario illustrated in FIG. 1 shows the game player 108 playing a boxing game that is being executed by gaming system 102. The gaming system 102 uses the television 104 to visually present a boxing opponent 110 to game player 108. Furthermore, the gaming system 102 uses the television 104 to visually present a player avatar 112 that the game player 108 controls with his movements. In one example scenario, the game player 108 can throw a punch in physical space as an instruction for the player avatar 112 to throw a punch in game space. The gaming system 102 and depth-sensing camera 100 can be used to recognize and analyze the punch of the game player 108 in physical space so that the punch can be interpreted as a game control that causes the player avatar 112 to throw a punch in game space. Likewise, other movements by the game player 108 may be interpreted as other controls, such as controls to bob, weave, shuffle, block, jab, or throw a variety of different power punches. Furthermore, some movements may be interpreted into controls that serve purposes other than controlling the player avatar 112. For example, the player may use movements to end, pause, or save a game, select a level, view high scores, communicate with a friend, etc. It will be understood that the use environment of FIG. 1 is shown for the purpose of example, and that a structured light depth-sensing camera may be used in any other suitable use environment. It will also be understood that an optical system according to the present disclosure may be used in any other suitable optical device than a structured light depth-sensing camera, including stereo depth-sensing cameras and other cameras.

Continuing with FIG. 1, the depicted depth-sensing camera 100 comprises a plurality of optical components, including a structured light projector 120, an infrared camera 122, and optionally a visible camera 124. Each of these optical components is connected to various electronics, such as a controller configured to control these components and to receive and process images from the infrared camera 122 and visible camera 124. Establishing and maintaining precision alignment of the structured light projector 120, infrared camera 122, and visible camera 124 may help to ensure proper and consistent performance by the depth-sensing camera 100. However, as mentioned above, where these optical components are mounted to the printed circuit board or printed circuit boards to which their respective electronic circuitry is mounted, such precision alignment may be difficult to establish and maintain, and may require difficult manual alignment steps during manufacturing.

Therefore, FIG. 2 shows an embodiment of an optical support 200 and separate printed circuit board 202 to which these optical components and the associated electrical and components are respectively mounted. The optical support 200 is configured to be mounted within a device outer casing (illustrated schematically by dashed line 206) in a location that is separated from the printed circuit board. In this manner, heat that is generated and dissipated by the electrical and thermal components mounted to the printed circuit board 202 may have a substantially lesser effect on the locations of the structured light projector 120, infrared camera 122, and visible camera 124 relative to one another due to the separation between the optical support 200 and the printed circuit board 202.

The use of the optical support 200 and printed circuit board 202 for separating optical and electrical components also may help to simplify manufacturing of an optical device. For example, because a printed circuit board is often designed with the mounting of electrical components in mind, the mounting of optical components to a printed circuit board may be a secondary consideration in the design of the printed circuit board, thereby leading to design compromises. Further, where spatially separated optical components (e.g. projector and camera) are mounted to different printed circuit boards, proper alignment may be difficult to achieve, and may utilize difficult and time-consuming manual alignment processes. Further, manufacturing steps such as making electrical connections between the electrical and optical components may potentially harm the alignment of the optical components.

On the other hand, the use of optical support 200 for mounting plural optical components in an optical device allows alignment of the optical components to be referenced to a common optical structure whose purpose is to maintain that alignment during manufacture and operation. To further help maintain optical alignment during manufacture, connections between electrical components 220 on the printed circuit board 202 and the optical components mounted to the optical support 200 may be made via one or more flexible conductors 230, thereby helping to ensure that optical alignment is not compromised by the conductors 230, or the process of installing and electrically connecting the conductors 230. Likewise, thermal functions also may be made secondarily to ensure that optical alignment is not compromised. Further, thermal components may interface with the optical support 200 in such a manner that the components are thermally insulated from the optical support 200 and/or are connected via interfaces that allow the components to "float" relative to the optical support. In the depicted embodiment, a heat sink 232 is shown extending from structured light projector 120, wherein the heat sink 232 interfaces with the optical support 200 via a gasket 234. Other thermal components that are associated with the electrical components 220, such as heat sink 236, may be mounted to printed circuit board 202, and therefore are spatially separated from the optical support 200, thereby reducing the effect on the optical support 200 of heat dissipated from these components. While the depicted embodiment shows a single printed circuit board coupled to a single optical support, it will be understood that other embodiments may utilize a plurality of printed circuit boards each connected to optical components on the optical support via one or more connectors. Further, some embodiments may comprise a plurality of optical supports each comprising two or more optical components.

The optical support 200 may have any suitable construction. For example, the optical support may be configured to have a relatively low coefficient of thermal expansion and high dimensional stability so that the relative alignment and positions of the optical components mounted to the optical support 200 remain stable during changes in temperature. In one example embodiment, the optical support 200 may take the form of a plate-like structure. Further, the optical support 200 may be made from any suitable material or materials, including but not limited to various metals, ceramics, composites, polymers, etc. In some embodiments, the optical support has a rigid construction to help to maintain alignment of components mounted to the optical support.

FIG. 3 shows an embodiment of a method 300 of assembling an optical device in which optical components are mounted to an optical support that is separated from a printed circuit board on which some electrical components are mounted. Method 300 comprises, at 302, mounting a plurality of optical components to an optical support. As described above, the optical support allows alignment of the optical components to be referenced to a common optical structure whose purpose is to maintain that alignment during manufacture and operation. Any suitable optical components may be mounted to the optical support. For example, in the specific embodiment of a structured light depth-sensing camera, such optical components may include a projector 308 and a first camera 304, such as an infrared camera. Further, in some embodiments, a second camera 306 also may be mounted to the optical support. The second camera may be, for example, a visible camera, a second camera for a stereo depth-sensing system, etc. It will be understood that these specific optical components are described for the purpose of example, and are not intended to be limiting in any manner.

Method 300 next comprises, at 310, positioning the optical support in an outer casing, and then at 312, fixing the position of the optical support within the outer casing so that the optical components are mounted in the casing. Likewise, method 300 also comprises, at 314, positioning a printed circuit board in the outer casing. In some embodiments, a plurality of printed circuit boards may be positioned in the outer casing, as shown at 316. Then, the position of the printed circuit board (or board) is fixed at location spaced from the optical support, as discussed above. It will be understood that the optical support and the printed circuit board may be placed and fixed in the outer container in any suitable order in a manufacturing process.

Next, as indicated at 322, method 300 comprises connecting one or more optical components to the printed circuit board via electrical conductors. In some embodiments, the conductors may be flexible, as indicated at 324. In this manner, the installation and connection of electrical components may not impact the optical components of the device to the same extent as where the optical components are mounted to a printed circuit board along with electronic components. This may help to avoid secondary alignment, fixturing and/or adjustment of optical components after mounting and device assembly, as the optical components are referenced to the optical support to which the components are designed and tolerance to.

It will be understood that the configurations and/or approaches for separating optical and electrical components in an optical device described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An optical device, comprising:
   an outer casing;
   an optical support fixed to a position within an interior of the outer casing;
   a plurality of optical components mounted to the optical support;
   a heat sink thermally coupled to a first optical component of the plurality of optical components, wherein at least a portion of the heat sink extends through the optical support;
   a gasket configured to thermally insulate the portion of the heat sink extending through the optical support;
   a printed circuit board separate from the optical support and fixed to a position in the outer casing that is spatially separated from the optical support and the plurality of optical components;
   one or more electrical components mounted to the printed circuit board; and
   one or more electrical conductors electrically connecting the one or more electrical components to the plurality of optical components.

2. The optical device of claim 1, wherein the optical device comprises a depth-sensing camera.

3. The optical device of claim 2, wherein the plurality of optical components comprises a projector, a first camera, and a second camera, and wherein the projector, the first camera, and the second camera are each mounted to the optical support.

4. The optical device of claim 3, wherein the projector comprises a laser and a diffractive optical element.

5. The optical device of claim 1, wherein the optical support is formed from one or more of a metal material, a ceramic material, and a polymer material.

6. The optical device of claim 1, wherein the one or more of the electrical components comprises a heat sink.

7. The optical device of claim 1, wherein the one or more electrical conductors are flexible.

8. The optical device of claim 1, further comprising a plurality of printed circuit boards.

9. A depth-sensing camera, comprising:
   an optical system comprising:
      a rigid optical support,
      a projector mounted to the optical support,
      a first camera mounted to the optical support,
      a second camera mounted to the optical support, and
      a heat sink at least partially extending through the optical support and thermally coupled to the projector, the heat sink coupled to the optical support via a gasket configured to thermally insulate the heat sink from the optical support; and
   an electrical/thermal system comprising:
      a printed circuit board separate from the optical support and spatially separated from the optical support,
      one or more electronic components mounted to the printed circuit board, and
      one or more thermal components mounted to the printed circuit board system and thermally floating relative to the optical support; and
   a plurality of electrical conductors electrically connecting the projector, the first camera, and the second camera respectively to the printed circuit board.

10. The depth-sensing camera of claim 9, wherein the optical support is formed from one or more of a metal, ceramic, composite, and polymer material.

11. The depth-sensing camera of claim 9, wherein the plurality of electrical conductors are flexible.

12. The depth-sensing camera of claim 9, further comprising a plurality of printed circuit boards, wherein each printed circuit board comprises at least some of the one or more electronic components coupled to the optical system.

13. The depth-sensing camera of claim 9, wherein the first camera is an infrared camera, and wherein the second camera is a visible camera.

14. A method of assembling an optical device, the optical device comprising a rigid optical support, a printed circuit board, and an outer casing, the method comprising:
   mounting a plurality of optical components to the optical support, wherein one or more optical components of the plurality of optical components comprises a heat sink at least partially extending through the optical support, the heat sink coupled to the optical support via a gasket configured to allow the heat sink to float relative to the optical support and to thermally insulate the heat sink from the optical support;
   positioning the optical support in the outer casing and fixing a position of the optical support relative to the outer casing;
   positioning the printed circuit board in the outer casing and fixing a position of the printed circuit board in a location that is spaced from the optical support; and
   connecting one or more of the plurality of optical components to the printed circuit board via one or more electrical conductors.

15. The method of claim 14, wherein the device is a depth-sensing camera.

16. The method of claim 15, wherein mounting a plurality of optical components to an optical support comprises mounting a projector, a first camera, and a second camera to the optical support.

17. The method of claim 14, wherein fixing the printed circuit board in the outer casing in a location that is spaced from the optical support comprises fixing the printed circuit board in the outer casing in a location that is spaced from thermal components that conduct heat away from the printed circuit board.

18. The method of claim 14, wherein connecting the one or more optical components to the printed circuit board comprises connecting the one or more optical components to the printed circuit board via one or more flexible connectors.

19. The method of claim 14, further comprising fixing a plurality of printed circuit boards in a location spaced from the optical support, and connecting the plurality of printed circuit boards to the plurality of optical components via a plurality of electrical conductors.

* * * * *